Sept. 19, 1967  F. H. LAISHLEY  3,342,981
APPARATUS FOR USE IN TESTING BATCHES OF ARTICLES
Filed May 7, 1964  3 Sheets-Sheet 1
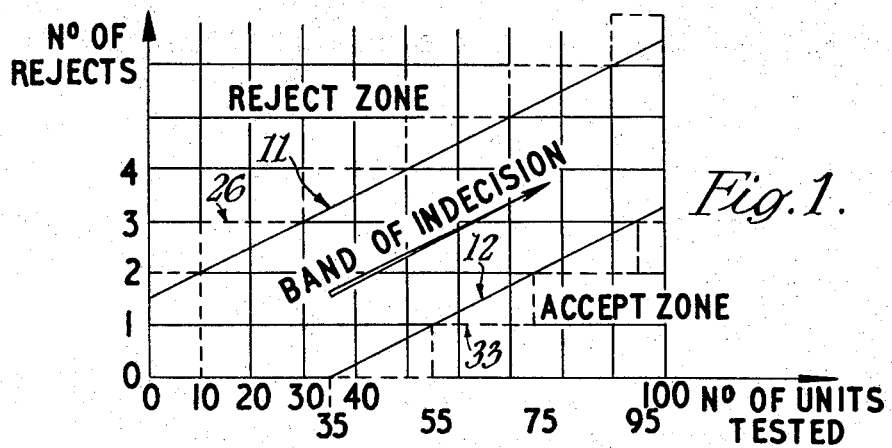
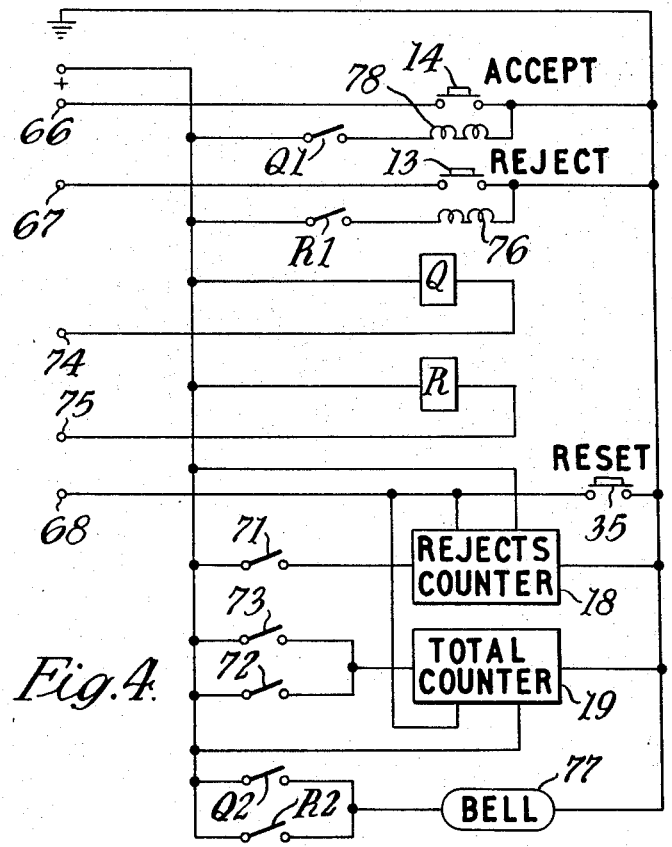

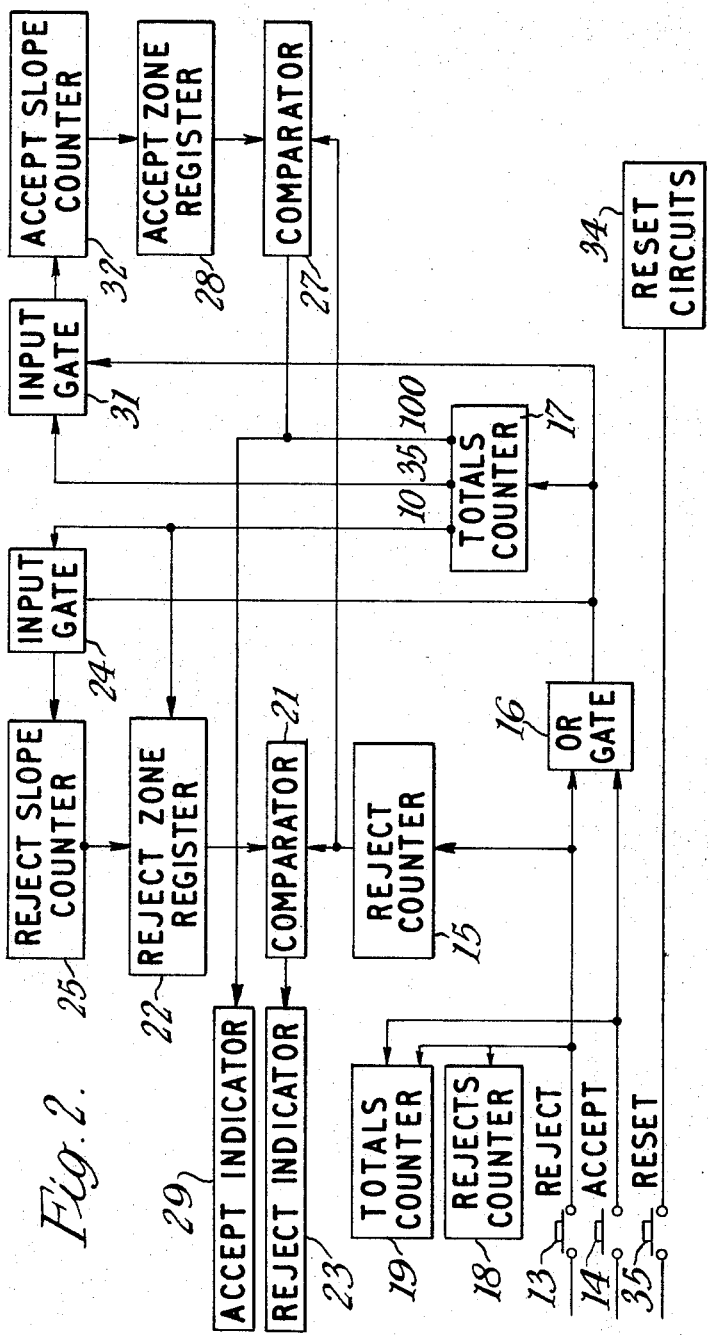

ered by the counter 17, and this is done by the counter 18 which is stepped by each operation of the button 13 or 14, and which opens the gate 31 after 35 operations.

United States Patent Office 3,342,981
Patented Sept. 19, 1967

3,342,981
APPARATUS FOR USE IN TESTING BATCHES OF ARTICLES
Frederick Herbert Laishley, Solihull, England, assignor to Joseph Lucas (Industries) Limited, Birmingham, England
Filed May 7, 1964, Ser. No. 365,662
Claims priority, application Great Britain, May 16, 1963, 19,444/63
1 Claim. (Cl. 235—92)

ABSTRACT OF THE DISCLOSURE

Apparatus for use in testing batches of articles includes a first counter for counting the number of articles tested, a second counter for counting the number of articles found to be faulty, registers for storing signals representing predetermined numbers which are controlled automatically in accordance with the reading of the first counter in a predetermined manner, and comparators for comparing the numbers in the registers with the number in the second counter, and warning means for indicating when a batch can either be accepted or rejected.

---

Figure 3:
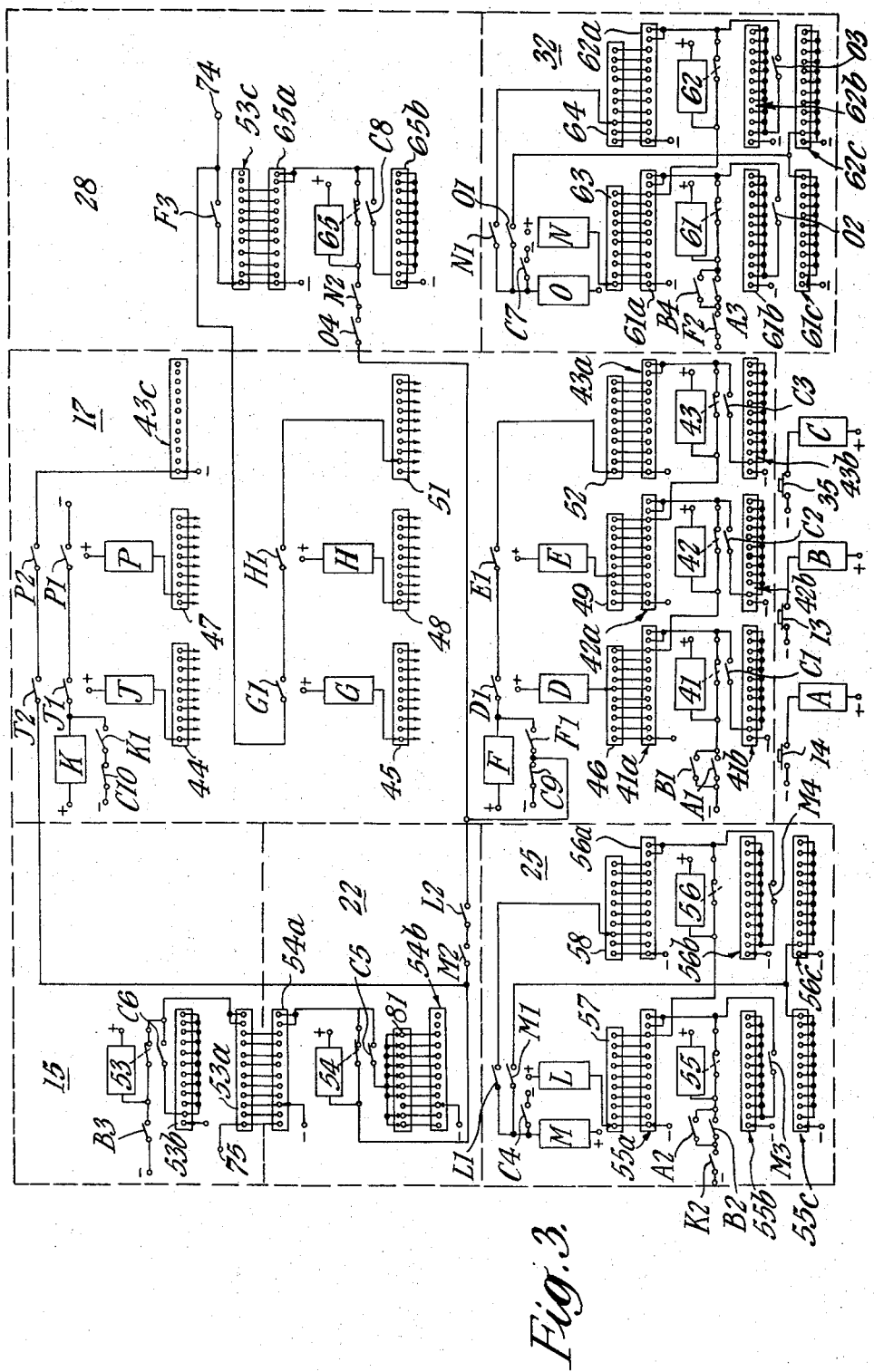

The conventional method of testing batches of articles is to select at random a sample comprising a predetermined number of articles from the batch and to count the number of faulty articles in the sample. A decision is then made as to whether to accept or reject the batch. However, it can be shown by considering the laws of probability that it is not always necessary to test each article in a sample before making a decision. For example, in a sample of 150 articles, a finding of three faulty articles in the first five tested may indicate that the batch may be rejected, whilst if the first twenty articles are satisfactory, the entire batch may be satisfactory. The actual figures involved will depend upon the stringency of the tests on a batch.

A theory based on the possibility of testing only part of a sample, has been evolved, and is termed Wald's theory. The theory can best be explained by considering the graph shown in FIG. 1. This graph represents a testing operation in which a sample consists of 100 articles. The number of articles tested and the number of articles rejected are plotted on the $x$ and $y$ axes respectively, and upper and lower parallel lines 11, 12 are drawn on the graph, the position and slope of these lines being determined by the nature of the particular testing operation for which the graph is to be used. The areas above the line 11 and below the line 12 respectively are termed the reject zone and the accept zone, and the area between the lines 11, 12 is called the band of indecision.

In testing a sample, a trace is drawn on the graph, and if the trace at any time enters the accept zone the batch is accepted. It will be seen that with the figures illustrated, the batch can be accepted if the first 36 articles are satisfactory. Similarly, the batch can be accepted if there is only one faulty article in the first 56 articles tested, or two faulty articles in the first 76, or three faulty articles in the first 96.

If at any time the trace enters the reject zone, the batch is rejected. Thus, the batch would be rejected if the first two articles were faulty, or if there were three faults in the first ten articles, four faults in the first 30 articles, five faults in the first 50 articles, six faults in the first 70 articles or seven faults in the first 90 articles.

If the trace remains in the band of indecision when the 100 articles have been tested, a decision is made in the conventional manner.

The use of Wald's theory has been shown to give marked savings in time in testing batches of articles. However, it is clearly impracticable to have to plot a trace on a graph, and the present invention relates to apparatus for simulating the plotting of a trace on a graph such as that shown in FIGURE 1, and giving an indication when a batch can be accepted or rejected.

Apparatus according to the invention comprises in combination a first counter for counting the number of articles tested, a second counter for counting the number of articles found to be faulty, first and second counting registers, means operable by the first counter for adjusting the settings of the registers so that when a predetermined number of articles have been tested the setting of the first counting register represents the minimum number of rejected articles required at that instant to enable a batch to be rejected, and the setting of the second counting register represents the maximum number of rejected articles permissible at that instant to enable a batch to be accepted, means for giving an indication when the numbers represented by the first counting register and the second counter become equal, and means operable only when the reading of the first counter reaches a predetermined value for giving an indication when the numbers represented by the second counting register and the second counter become equal.

In the accompanying drawings, FIGURE 1 is the graph already referred to in the specification, FIGURE 2 is a block diagram illustrating one example of the invention, FIGURE 3 is a detailed diagram of the circuit, and FIGURE 4 illustrates part of the circuit not shown in FIGURE 3.

Referring to FIGURE 2, an operator testing a sample can operate either a reject button 13 or an accept button 14. Operation of the button 13 causes a signal to be passed to a reject counter 15, and operation of either button 13, 14 causes a signal to be applied through an OR gate 16 to a totals counter 17. In addition, the button 13 operates a counter 18, and both buttons 13, 14 operate a counter 19, the counters 18, 19 being readily visible to the operator.

A comparator 21 continuously compares the reading of the counter 15 with the reading of a reject zone counting register 22, and when the readings are equal an output is produced which operates a reject indicator 23 visible to the operator. Initially the circuit arrangement is such that the reading in the register 22 is the number of successive rejects which would be required at the beginning of a test to enable the batch being tested to be rejected. In FIGURE 1 this number is 2, and for convenience the remainder of the description will be linked to the particular numerical values shown in FIGURE 1.

When the reading of the counter 17 is 10, a pulse is supplied to the register 22 to change its reading to 3. Simultaneously, a pulse is applied to open an input gate 24, and thereafter each pulse supplied through the gate 16 is applied to a reject slope counter 25 which operates to increase the reading of the register 22 by one for each 20 pulses received. It will be appreciated that in this way the line 11 in FIGURE 1 is simulated by the dotted line 26.

A further comparator 27 compares the readings of the counter 15 and an accept zone counting register 28 and after the first 35 pulses, operates an accept indicator 29 when the readings are equal. The reading of the register 28 is initially zero, but when 35 articles have been tested a gate 31 is opened to admit pulses to an accept slope counter 32. The counter 32 increases the reading of the register 28 by one after each further 20 signals, so that the line 12 in FIGURE 1 is simulated by the dotted line 33. It will be understood that it is necessary to block the output from comparator 27 unit 35 pulses have been received, because otherwise an accept indication would be obtained immediately unless the first article was faulty.

When the full hundred articles have been tested without operation of either indicator 23, 29, the counter 17 produces an output to operate the indicator 29. The apparatus can be reset by suitable reset circuits indicated at 34 in FIGURE 2, the circuits 34 being controlled by a button 35.

Referring now to FIGURE 3, the dotted boxes represent boxes seen in FIGURE 2, and have been assigned similar reference numerals. The counter 17 incorporates a uniselector 41 having banks 41a, 41b, a uniselector 42 having banks 42a, 42b, and a uniselector 43 having banks 43a, 43b and 43c. The uniselectors are coupled so that each ten operations of the uniselector 41 causes operation of the uniseletcor 42, and each ten operations of the uniselector 42 causes operation of the uniselector 43. Moreover, the uniselector 41 has associated therewith three switches 44, 45, 46 each having ten contacts connected to the contacts of the bank 41a. Similar switches 47, 48, 49 are associated with the uniselector 42, whilst switches 51, 52 are associated with the uniselector 43. Variable points on the switches are connected to other points of the circuit, and it will be seen that in the particular example being described the switches 44, 47 are set to the value of 10, the switches 46, 49, 52 to the value 35, and the switches 45, 48, 51 to the value 100.

Each time the button 14 is depressed, a relay A is energised and closing of a contact A1 operates the uniselector 41 once. Similarly, depression of the button 13 operates a relay B to close contact B1 in parallel with contact A1. The relays A, B and contacts A1, B1 thus act as the OR gate 16. Energisation of relay B serves also to close contact B3 which operates the reject counter 15 consisting of a uniselector 53 having banks 53a, 53b and 53c.

Operation continues until the count in the counter 17 reaches the value 10, at which point relays J and P associated with the switches 44, 47 are energised. The resultant closing of contacts P2, J2 completes a circuit from the uniselector bank 43c to a uniselector 54 which constitutes the reject zone register 22 and has banks 54a and 54b. The uniselector 54 is initially set at the value 2, and is now stepped one.

Energisation of realys J, P also closes contacts J1, P1 to complete a circuit to energise a relay K which holds on through contacts K1, C10 in series. The relay K closes a contact K2 associated with the reject slope counter 25, which comprises a uniselector 55 having banks 55a, 55b, 55c, and a uniselector 56 having banks 56a, 56b, 56c. The uniselector 56 is operated once for each ten operations of the uniselector 55, and moreover the banks 55a, 56a have switches 57, 58 associated therewith. Variable points on the switches 57, 58 are set to represent the number of counts after which the register 22 must be operated, in this case twenty.

Once the contact K2 has been closed, relay contacts A2, B2 in parallel ensure that each article tested is counted by the counter 25. After a further twenty counts, a relay L is energised, so that a circuit is completed through bank 56a, switch 58 and contact L1 to energise a relay M. A circuit is now completed by way of a contact C9 in the counter 17 and contacts L2, M2 to operate the uniselector 54 once. The uniselectors 55, 56 are immediately reset by way of the banks 55b, 56b and contacts M3, M4, the relay L being de-energised immediately the resetting operation commences when a count of 35 is reached, at which point setting operation is complete.

The accept slope counter 32 is similar to the counter 25, and comprise uniselectors 61, 62 and associated switches 63, 64 and relays O, N. Operation of the counter 32 commences when a count of 35 is reached, at which point relays D, E are energised, and contacts D1, E1 close to energise relay F, which holds on through contacts F1, C9 and closes contacts F2 so that the counter 32 is thereafter operated by closing either of contacts A3 or contact B4.

The accept zone register 28 comprises a uniselector 65, equivalent to the uniselector 54 except that it resets to zero, and after each 20 operations of the counter 32 the register 28 is operated through contacts C9, O4 and N2 in series. The uniselectors 61, 62 reset in similar fashion to the uniselectors 55, 56.

Turning for the moment to FIGURE 4, it will be noted that the buttons 13, 14 and the button 35 are shown in this figure as well as in FIGURE 3. In fact, FIGURE 4 shows the components in the operator's hand control, these components including the buttons 13, 14, 35, when are shown in FIGURE 3 merely for convenience. The terminals 66, 67, 68 indicate the points of connection to the relays A, B, C in FIGURE 3. Also shown in FIGURE 4 are switches 71, 72 ganged to the button 13, and a switch 73 ganged to the button 14 for operating the counters 18, 19, and further terminals 74, 75 which are connected to corresponding terminals 74, 75 in FIGURE 3.

It will be noted that the respective contacts of uniselector banks 53a, 54a are interconnected, so that if the readings of the register 22 and counter 15 become equal a circuit is completed through terminal 75 to operate relay R. Contact R1 now closes to illuminate a lamp 76 associated with the button 13, and contact R2 closes to operate a bell 17.

Uniselector banks 53c, 65a are similarly connected, but no signal can be passed to the terminal 74 until the relay F has been energised to close contact F3. Once contact F3 is closed, a relay Q is energised when the settings of the banks 53c, 65a are equal, contact Q1 closing to illuminate a lamp 78 associated with the button 14, and contact Q2 closing to operate the bell 77.

If neither relay R, Q is energised before 100 articles have been tested, relays G, H are energised and a circuit is completed through switch 51 and contacts H1, G1 to the relay Q.

In order to reset the apparatus, the button 35 is depressed to energise relay C. The resultant closing of contacts C1, C2, C3, C6 and C8 permits uniselectors 41, 42, 43, 53 and 65 to reset through their contacts marked with a suffix b. Closing of contact C4 energises relay M, closing contact M1 so that uniselectors 55, 56 reset through their banks 55c, 56c. Similarly, uniselectors 61, 62 reset through contact 01 on energisation of relay 0 when contact C7 closes. Contact C5 is connetced to all but one of the contacts of a switch 81 associated with the bank 54b, so that uniselector 54 resets to a reading of 2. Finally, contacts C9, C10 open when relay C is energised, so breaking the circuits to relays K, F, respectively.

Having thus described my invention what I claim as new and desire to secure by Letters Patent is:

Apparatus for use in testing batches of articles, comprising in combination a first counter for counting the number of articles tested, a second counter for counting the number of articles found to be faulty, a first counting register which stores a signal representing a predetermined number, a first comparator comparing the outputs from the second counter and the first register, warning means operable by said first comparator whenever the number represented by the second counter becomes equal to the number stored in said first register, a reject slope counter coupled to the first counter and to the first register, said reject slope counter adjusting the setting of the first register in accordance with the reading of the first counter so that at any instant the setting of the first register represents the minimum number of rejected articles required at that instant to enable a batch to be rejected, a second counter register which stores a predetermined number, a second comparator comparing the outputs from the second counter and the second register, warning means operable by said second comparator under the control of said first counter for giving an indication when the numbers represented by the second counter and second register become equal, provided that the reading of the first counter has reached a predetermined number representing the minimum number of non-faulty articles which must be tested at the commencement of a testing operation before a batch can be accepted, and an accept slope counter coupled to the first counter and to the second register, said accept slope counter adjusting the setting of the second register in accordance with the reading of the first counter so that at any instant, after said predetermined number of articles have been tested, the setting of the second register represents the maximum number of rejected articles permissible at that instant to enable a batch to be accepted.

References Cited

UNITED STATES PATENTS 2,730,300  1/1956  Savino _____ 235—92
2,768,784  10/1956  Gordon _____ 235—92

DARYL W. COOK, *Acting Primary Examiner.*

MAYNARD R. WILBUR, *Examiner.*

G. MAIER, *Assistant Examiner.*